US011643160B2

(12) United States Patent
Downing (10) Patent No.: US 11,643,160 B2
(45) Date of Patent: May 9, 2023

(54) ACCESSORY MOUNTING SYSTEM (71) Applicant: Southern California Design Company, Carlsbad, CA (US)

(72) Inventor: Travis Downing, Carlsbad, CA (US)

(73) Assignee: Southern California Design Company, Carlsbad, CA (US)

( * ) Notice: Subject to any disclaimer, the term of this patent is extended or adjusted under 35 U.S.C. 154(b) by 318 days.

(21) Appl. No.: 17/137,138

(22) Filed: Dec. 29, 2020

(65) Prior Publication Data
US 2022/0204106 A1 Jun. 30, 2022

(51) Int. Cl.
*B62J 11/00* (2020.01)
*B62J 45/00* (2020.01)

(52) U.S. Cl.
CPC .............. *B62J 11/00* (2013.01); *B62J 45/00* (2020.02)

(58) Field of Classification Search
CPC ... B62J 11/00; B62J 11/22; B62J 45/00; B62J 45/42; B62J 45/422
See application file for complete search history.

(56) References Cited

U.S. PATENT DOCUMENTS

| | | | | |
|---|---|---|---|---|
| 5,735,441 A | * | 4/1998 | Fujimoto | B62J 11/00 224/420 |
| 5,921,669 A | * | 7/1999 | Taylor | B62J 6/00 362/396 |
| 6,283,620 B1 | * | 9/2001 | Taylor | F21V 21/0885 362/396 |
| 6,446,922 B2 | * | 9/2002 | Irie | B62J 50/22 248/230.1 |
| 6,837,599 B2 | | 1/2005 | Liaw et al. | |
| 7,070,295 B1 | * | 7/2006 | Lee | B62J 6/03 362/474 |
| 7,077,302 B2 | * | 7/2006 | Chuang | B62J 11/00 224/442 |
| 7,490,965 B2 | | 2/2009 | Okada et al. | |

(Continued)

FOREIGN PATENT DOCUMENTS

| | | |
|---|---|---|
| CN | 103323016 A | 9/2013 |
| CN | 104908864 A | 9/2015 |

(Continued)

*Primary Examiner* — Kevin Hurley
*Assistant Examiner* — Michael R Stabley
(74) *Attorney, Agent, or Firm* — Roeder & Broder LLP; James P. Broder (57) ABSTRACT The present invention is directed toward an accessory mounting system. The accessory mounting system can be used to mount an accessory to a vehicle. The accessory mounting system includes a base assembly and an accessory assembly. The base assembly can be fixedly positionable on the vehicle about a first axis, the base assembly including a first locking member and a base assembly second member. The accessory assembly can be removably securable to the base assembly. The accessory assembly can include a second locking member that selectively engages the first locking member. The accessory assembly can be rotatable about the first axis relative to the base member. The accessory mounting system can further include a charger that receives the accessory assembly. The charger can include a charge receiver engager that electrically engages the charge receiver, and electrically disengages from the charge receiver.

20 Claims, 8 Drawing Sheets

(56) References Cited

U.S. PATENT DOCUMENTS

| | | | |
|---|---|---|---|
| 7,504,983 B2* | 3/2009 | Chen | G01S 7/03 |
| | | | 342/20 |
| 7,661,858 B2* | 2/2010 | Chuang | F21L 4/00 |
| | | | 362/396 |
| 7,779,724 B2* | 8/2010 | Fujii | B62M 25/08 |
| | | | 340/432 |
| 8,132,700 B2 | 3/2012 | Dacko | |
| 8,596,506 B2* | 12/2013 | Yu | B62J 11/00 |
| | | | 224/419 |
| 8,887,975 B1* | 11/2014 | Basile | B62J 11/00 |
| | | | 224/452 |
| 9,290,223 B2* | 3/2016 | Lee | B62J 6/03 |
| 10,028,356 B2 | 7/2018 | Luk et al. | |
| 10,093,379 B2 | 10/2018 | Hines et al. | |
| 10,532,786 B1 | 1/2020 | Matthey et al. | |
| 2014/0371953 A1 | 12/2014 | Miller et al. | |
| 2017/0021884 A1 | 1/2017 | Ebel | |
| 2019/0002052 A1 | 1/2019 | Chen et al. | |
| 2019/0315432 A1 | 10/2019 | Bockmann | |
| 2020/0010136 A1 | 1/2020 | Yun | |

FOREIGN PATENT DOCUMENTS

| | | |
|---|---|---|
| CN | 105674978 A | 6/2016 |
| CN | 106168488 A | 11/2016 |
| DE | 202017001150 U1 | 5/2017 |
| FR | 3084050 A1 | 1/2020 |
| KR | 1 02042548 B1 | 11/2019 |
| WO | WO2019199167 A1 | 10/2019 |

* cited by examiner

ACCESSORY MOUNTING SYSTEM

BACKGROUND

Many people are opting for bicycles over traditional vehicles such as cars as a healthy low-cost form of transportation. Vehicles including bicycles often include accessories which improve the riding experience and safety. These accessories are frequently mounted to the vehicles and can include lights, computers, water bottle holders, bells, and more. Mounting systems for these accessories regularly allow for fixed or pre-set positions. However, most mounting systems are unstable and difficult to adjust for elevation. For bicycle lights, precise aim is required to illuminate the roadway or path of the rider. A common issue with mounted bike lights is the need to re-aim the lights every time they are secured and unsecured. Other adjustment issues include the inability to precisely aim the light in directions outside of the vertical (pitch) axis. Bike lights are typically sold individually and do not offer a full field of illumination in tandem with other lights.

SUMMARY

The present invention is directed toward an accessory mounting system that can be used to mount an accessory to a vehicle. The accessory mounting system includes a base assembly and an accessory assembly. The base assembly can be fixedly positionable on the vehicle about a first axis. The base assembly can include a first locking member and a base assembly second member. The accessory assembly is removably securable to the base assembly. The accessory assembly can include a second locking member that selectively engages the first locking member. The accessory assembly can be rotatable about the first axis relative to the base member between (i) a disengaged position wherein the locking members are disengaged from one another so that the accessory assembly is removable from the base assembly, and (ii) an engaged position wherein the locking members are engaged with one another so that the accessory assembly is removably secured to the base assembly.

In some embodiments, the base assembly further includes a collar that receives the first locking member and the base assembly second member, the collar being configured to allow movement of the first locking member and the base assembly second member relative to the vehicle.

In certain embodiments, the accessory assembly can include an illuminator.

In various embodiments, the accessory assembly can be configured to selectively rotate relative to the vehicle about a second axis that is different than the first axis.

In some embodiments, the first axis can be a pitch axis.

In certain embodiments, the second axis can be a roll axis.

In various embodiments, the base assembly and the accessory assembly can cooperate so that the accessory assembly is infinitely positionable about the pitch axis when the base assembly is in the unsecured position.

In some embodiments, the base assembly and the accessory assembly cooperate so that the accessory assembly is infinitely positionable about the roll axis when the base assembly is in the unsecured position.

In certain embodiments, the accessory assembly can be configured to selectively rotate relative to the vehicle about a third axis that is different than the first axis and second axis when the base assembly is in the unsecured position In various embodiments, the third axis can be a yaw axis.

In some embodiments, the base assembly and the accessory assembly cooperate so that the accessory assembly is infinitely positionable about the yaw axis when the base assembly is in the unsecured position.

In certain embodiments, the base assembly can have three degrees of freedom relative to the vehicle.

In various embodiments, the base assembly and the accessory assembly can be movable in concert relative to the vehicle about a first axis, a second axis, and a third axis while the base assembly is in the unsecured position.

In some embodiments, the first axis is substantially perpendicular to at least one of the second axis and the third axis.

In certain embodiments, the base assembly can be a truncated ball and socket joint.

The present invention is also directed toward an accessory mounting system for mounting an accessory to a vehicle. The base assembly can be adjustable on the vehicle about a first axis and a second axis that is different than the first axis so that the base assembly has at least two degrees of freedom while the base assembly is in an unsecured position. The base assembly can include a first locking member. The accessory assembly can be removably securable to the base assembly about a first axis and a second axis so that the accessory assembly has at least two degrees of freedom. The accessory assembly can include a second locking member that selectively engages the first locking member. The accessory assembly can be rotatable about the first axis relative to the base member between (i) a disengaged position wherein the locking members are disengaged from one another so that the accessory assembly is removable from the base assembly, and (ii) an engaged position wherein the locking members are engaged with one another so that the accessory assembly is removably secured to the base assembly.

In various embodiments, the accessory assembly can include an accessory and a charge receiver that receives electricity that charges the accessory.

In some embodiments, the accessory mounting system can further comprise a charger that receives the accessory assembly. The charger can include a charge receiver engager that (i) electrically engages the charge receiver of the accessory assembly during charging of the accessory, and (ii) electrically disengages from the charge receiver of the accessory assembly.

In certain embodiments, the charger can have a charger pitch axis. The accessory assembly and the charger can rotate relative to one another about the charger pitch axis between a non-charging position and a charging position.

The present invention is also directed toward an accessory mounting system for mounting an accessory to a vehicle. The base assembly can be fixedly positionable on the vehicle about a first axis, a second axis, and a third axis. The base assembly can include a first locking member. The accessory assembly can be removably securable to the base assembly. The accessory assembly can include an accessory, a charge receiver, and a second locking member that selectively engages the first locking member. The accessory assembly can be rotatable about the first axis relative to the base member between (i) a disengaged position wherein the locking members are disengaged from one another so that the accessory assembly is removable from the base assembly, and (ii) an engaged position wherein the locking members are engaged with one another so that the accessory assembly is removably secured to the base assembly. The second locking member can include a lock that is configured to be selectively locked and unlocked so that the second locking member can be selectively engaged to the first locking member.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of an accessory mounting system for a vehicle. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it is appreciated that such a development effort might be complex and time-consuming, but would nevertheless be a routine undertaking of engineering for those of ordinary skill in the art having the benefit of this disclosure. It is further understood that although the description and drawings provided herein focus on illumination devices being mounted to bicycles, other types of devices can somewhat similarly be mounted to bicycles or other suitable types of vehicles. No limitations are intended by showing and describing one type of device being mounted over any other, or the devices being mounted to one type of vehicle over any other.

Figure 1:
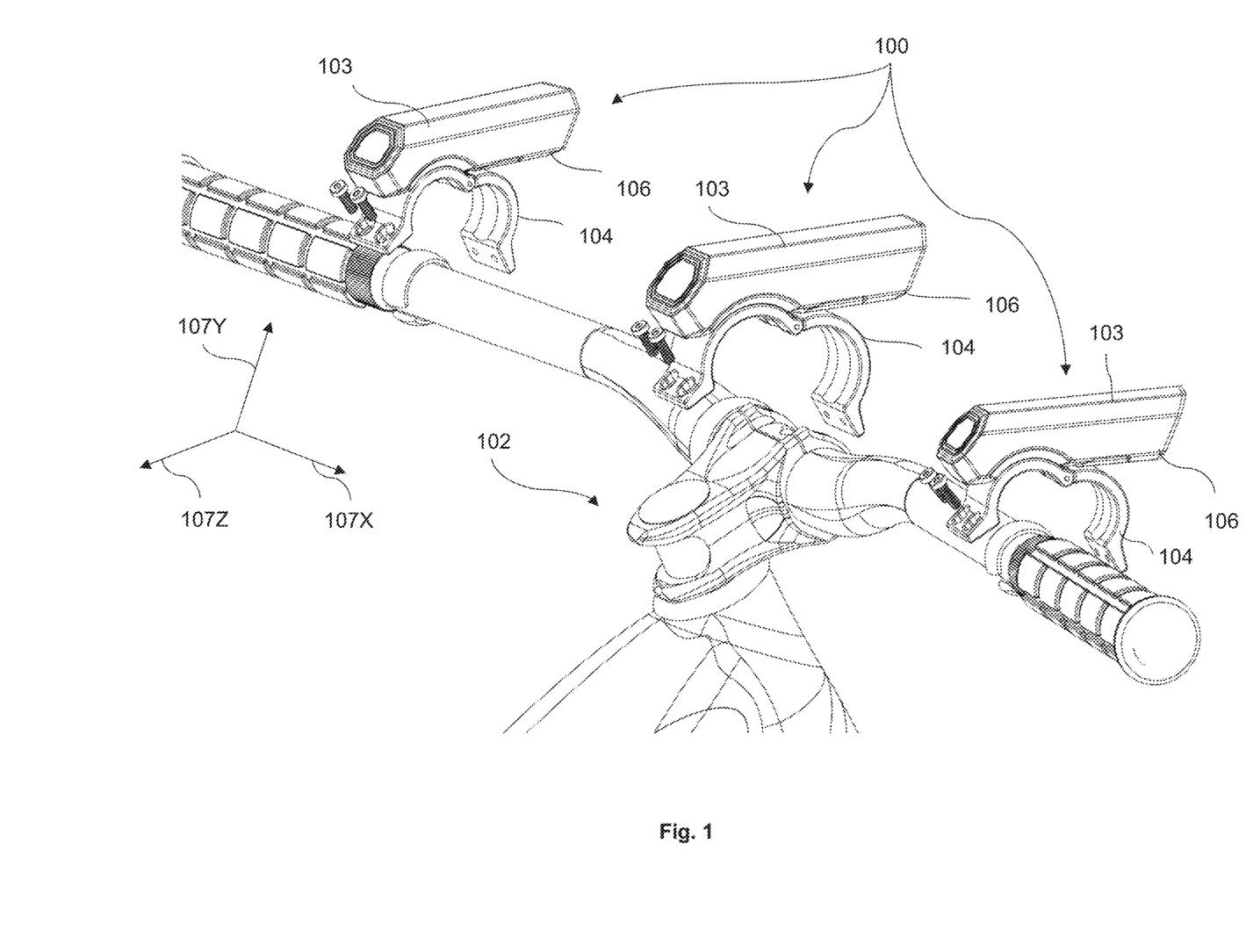
FIG. 1 is a perspective view of a portion of a vehicle and one embodiment of an accessory mounting system having features of the present invention, the accessory mounting system including a plurality of base assemblies and a plurality of accessory assemblies, the accessory mounting system being shown in a unsecured position relative to the vehicle.

FIG. 1 is a perspective view of one embodiment of an accessory mounting system 100 and a portion of a vehicle 102. In various embodiments, the accessory mounting system 100 is movable among an unsecured position, a movably secured position, and a fixedly secured position relative to the vehicle 102. In FIG. 1, the accessory mounting system 100 is shown in an unsecured position relative to the vehicle 102. As used herein, the "unsecured position" is understood to mean not secured to the vehicle 102. Stated another way, "unsecured position" is intended to mean detached, disengaged, or otherwise not mounted to the vehicle 102. Conversely, the "fixedly secured position" is understood to mean the opposite of "unsecured position." "Fixedly secured position" is understood to mean secured, attached, fixed, or otherwise mounted to the vehicle 100. "Movably secured position" is understood to mean that the accessory mounting system 100 has be mounted onto the vehicle 102, but the accessory mounting system 100 has not yet been fixed in position relative to the vehicle 102, such that the accessory mounting system 100 can still be adjusted in position relative to the vehicle 102. The accessory mounting system 100 removably and securely attaches or couples one or more accessories 103 to the vehicle 102. The non-accessory objects can be adapted to utilize the accessory mounting system 100. The accessory mounting system 100 can removably and securely attach one or more non-accessory objects to a vehicle 102. The accessory mounting system 100 can vary depending on the design requirements of the system, the accessory 103, or the vehicle 102.

It is understood that the accessory mounting system 100 can include additional components, systems, subsystems, and elements than those specifically shown and/or described herein. Additionally, or alternatively, accessory mounting system 100 can omit one or more of the components, systems, subsystems, and elements that are specifically shown and/or described herein. It is recognized that in some embodiments, the accessory mounting system 100 can include one or more accessories 103, such as that shown in FIG. 1. In some embodiments, the accessory mounting system 100 can omit the accessory 103 so that the accessory 103 is separate from the accessory mounting system 100.

The accessory mounting system 100 can be mounted in any suitable location and/or position on a vehicle 102. In the embodiment depicted in FIG. 1, the accessory mounting system 100 can be mounted to the handlebars of the vehicle 102. Alternatively, the accessory mounting system 100 can be used to mount accessories 103 to non-vehicles. Non-exclusive examples of non-vehicles include sport and recreational apparel, other types of apparel, and/or safety devices. It is understood that the accessory mounting system 100 can be mounted in any reasonable location. Components of the accessory mounting system 100 can be interchanged, removed, or added so that the accessory mounting system 100 can be mounted on any suitable object.

The accessory mounting system 100 can have mounting mechanics somewhat similar to that of a universal joint and/or a truncated ball and socket connection. In certain embodiments, using a ball and socket connection enables the accessory mounting system 100 to be capable of motion around an indefinite number of axes, which can have one or more common centers of rotation. The accessory mounting system 100 can be aimed using the various degrees of freedom afforded by the design of the accessory mounting system 100.

As used herein, the term "accessory" can refer to a vehicle accessory 103, but can also refer to any devices, customizations, components, systems, subsystems, and elements that are not specifically shown and/or described herein, but can nonetheless be utilized by the accessory mounting system 100. The accessory 103 used in the accessory mounting system 100 can include, but is not limited to, bike lights, computers, bells, horns, mobile devices, mobile device holders, levels that assist the user in leveling the accessory system 100 with the surface below, cup and water bottle holders, and/or other suitable accessories. The accessories 103 used with the accessory mounting system 100 can vary and multiple accessories 103 can be utilized within the same accessory mounting system 100.

The configuration of the accessory mounting system 100 allows for the full customization of the positioning of the various accessories 103 within the accessory mounting system 100. For example, bike lights included within accessory mounting system 100 can be adjusted to provide a full field of illumination. The mounting system 100 allows for easy installation and removal of the accessories 103 without needing to re-aim the attached accessories 103, such as bike lights. As used herein, "Light" can refer to an illuminator, a lamp, or any other device that provides illumination. In some embodiments, the accessories 103 within the accessory mounting system 100 can include one central illuminator and two side illuminators. In such an arrangement, the two side illuminators can have wide flat beam configurations that provide a full field of illumination and better visibility, but can also use any suitable beam configuration.

In the embodiment illustrated in FIG. 1, the accessory mounting system 100 includes three base assemblies 104 and three accessory assemblies 106. Although three base assemblies and three accessory assemblies are illustrated in FIG. 1, it is understood that the accessory mounting system 100 can include any suitable number of base assemblies 104 and accessory assemblies 106, such as fewer or greater than three. Each base assembly 104 can be selectively secured, attached, or otherwise fastened to the vehicle 102 so that the base assembly 104 is in the fixedly secured position relative to the vehicle. In the embodiment depicted in FIG. 1, each base assembly 104 can be selectively secured or otherwise fastened to the handlebars of the vehicle 102. The base assembly 104 can provide a secured base and attachment point for other components of the accessory mounting system 100. The base assembly 104 and the accessory assembly 106 can cooperate to secure the accessory 103 to the vehicle 102. The base assembly 104 can cooperate with and secure objects other than the accessory 103, if the non-accessory object is configured to cooperate with the accessory assembly 106. Alternatively, the accessory assembly 106 can be configured to cooperate with the non-accessory object.

The base assembly 104 couples and/or secures the accessory assembly 106 (and the accessory 103, as applicable) to the vehicle 102. In various embodiments shown and described herein, while in the unsecured position, the base assembly 104 is rotatable about at least three different axes with respect to the vehicle 102. As shown in FIG. 1, these axes can include a first axis 107X (such as a pitch axis), a second axis 107Y (such as a yaw axis), and a third axis 107Z (such as a roll axis). It is understood that any of the first axis 107X, the second axis 107Y or the third axis 107Z described herein can be the pitch, yaw or roll axis. In one embodiment, the first axis 107X, the second axis 107Y, and the third axis 107Z are substantially perpendicular to one another. Alternatively, the first axis 107X, the second axis 107Y and the third axis 107Z are not substantially perpendicular to one another.

The base assembly 104 can vary depending on the design requirements of the accessory mounting system 100, the type, size, and/or configuration of the accessory 103, and/or the specifics of the vehicle 102 upon which the accessory 103 is to be mounted. It is understood that the base assembly 104 can include additional components, systems, subsystems, and elements other than those specifically shown and/or described herein. Additionally, or alternatively, the base assembly 104 can omit one or more of the components, systems, subsystems, and elements that are specifically shown and/or described herein.

In the embodiment shown in FIG. 1, the base assembly 104 and the accessory assembly 106 are in a locked position. As used herein, the "locked position" is understood to mean the base assembly 104 and the accessory assembly 106 are locked and engaged to each other. Conversely, the "unlocked position" is understood to mean the opposite of "locked." In the unlocked position, the base assembly 104 and the accessory assembly 106 are not locked to each other, but can engage one another.

The accessory assembly 106 can contain and/or retain the accessory 103. The accessory assembly 106 can selectively engage and lock the base assembly 104 so that the accessory assembly 106 is in a locked position relative to the base assembly 104. While in the locked position, both the accessory assembly 106 and the base assembly 104 can cooperate to become selectively secured relative to the vehicle 102. The accessory assembly 106 can selectively disengage and unlock from the base assembly 104 so that the accessory assembly 106 is in an unlocked position relative to the base assembly 104.

The accessory assembly 106 can vary depending on the design requirements of the system, the accessory 103, and/or the vehicle 102. It is understood that the accessory assembly 106 can include additional components, systems, subsystems, and elements than those specifically shown and/or described herein. Additionally, or alternatively, the accessory assembly 106 can omit one or more of the components, systems, subsystems, and elements that are specifically shown and/or described herein.

As used herein, the terms "infinitely positioned" or "infinitely positionable" are understood to mean that the accessory 103, the base assembly 104, and the accessory assembly 106 can each have an unlimited (or infinite) number of adjustable positions that they can be set about the first axis 107X, the second axis 107Y and the third axis 107Z relative to the vehicle 102. In some embodiments, the vehicle 102 is the only limitation on the adjustability of the accessory 103, the base assembly 104, and the accessory assembly 106. For example, the vehicle 102 can have handlebars which would impede or block the motion or positioning of the accessory 103, the base assembly 104, and the accessory assembly 106.

In various embodiments shown and described herein, such as FIG. 1, the accessory assembly 106 and the base assembly 104 are movable in unison about three different axes while the accessory assembly 106 is in the locked position with respect to the base assembly 104 and while the base assembly 104 is in the unsecured position with respect to the vehicle 102. While in the locked position and the unsecured position, the accessory assembly 106 can be infinitely positioned about the first axis 107X, the second axis 107Y, and the third axis 107Z.

After moving from the locked position to the unlocked position, the accessory assembly 106 can be removed from the base assembly 104. In certain embodiments, after moving from the locked position to the unlocked position, the accessory assembly 106 can rotatably slide and disengagably detach from the base assembly 104 about the pitch axis. Alternatively, the accessory assembly 106 can be movable and/or rotatable relative to the base assembly 104 while the accessory assembly 106 is in the unlocked position with respect to the base assembly 104. In the unlocked position, the accessory assembly 106 can selectively engage the base assembly 104 without reaching the locked position. If the accessory assembly 106 is in the unlocked position with respect to the base assembly 104 and if the base assembly 104 is in the fixedly secured position with respect to the vehicle 102, only the accessory assembly 106 is movable about the three different axes.

The accessory mounting system 100 can be attached to a vehicle 102 using one or more of the following steps. The base assembly 104 can be selectively secured or fastened to the vehicle 102. The accessory assembly 106 can be placed in an unlocked position and can be slid onto the base assembly 104. The accessory assembly 106 can engage and lock the base assembly 104 to reach the locked position. The base assembly 104 and the accessory assembly 106 can be adjusted to the desired position relative to the vehicle 102. The base assembly 104 and the accessory assembly 106 can each be placed in the fixedly secured position relative to the vehicle 102. It is understood that this method can include additional steps than those specifically shown and/or described herein. Additionally, or alternatively, the described method can omit one or more of the steps that are specifically shown and/or described herein.

Figure 2:
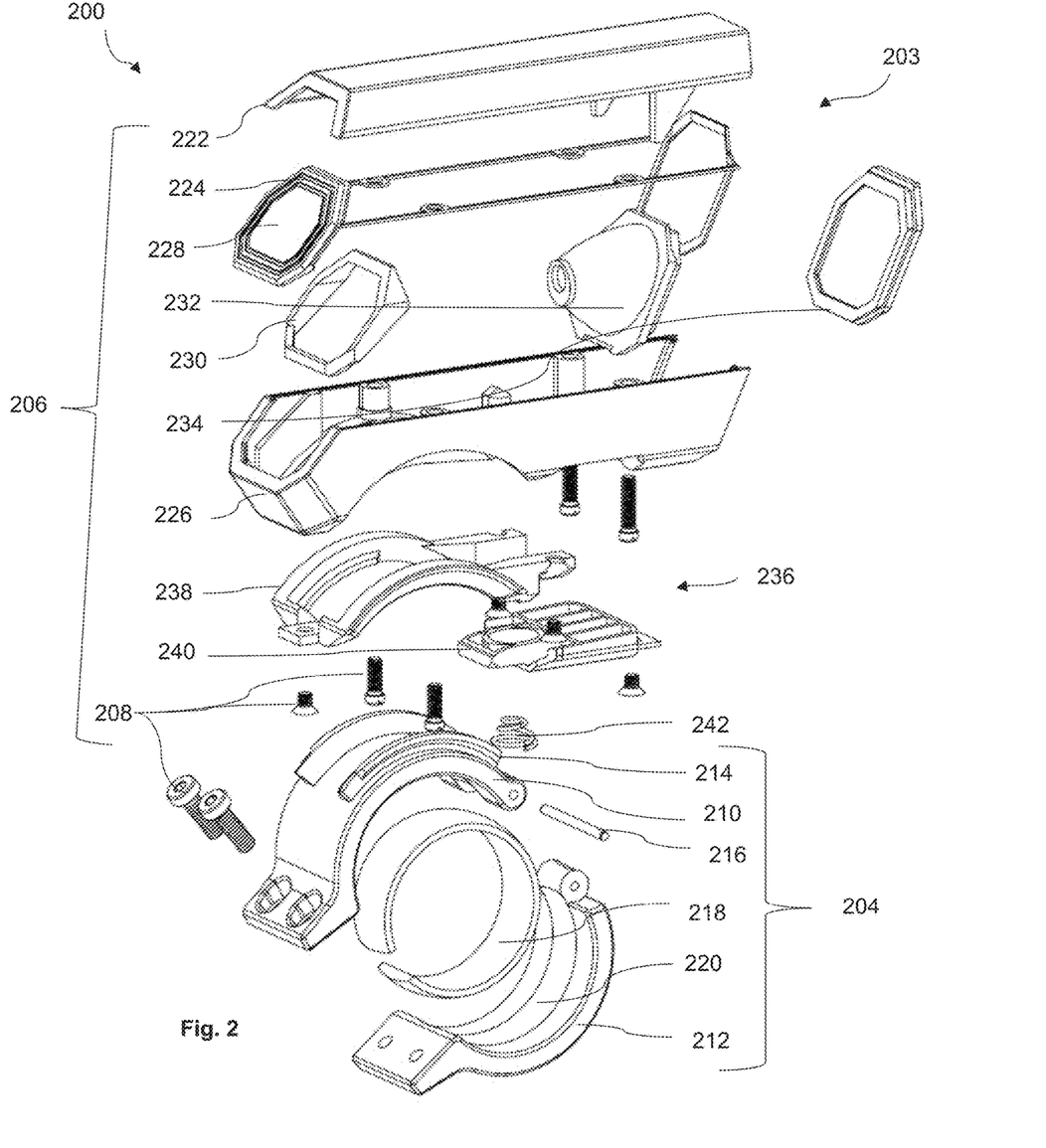
FIG. 2 is an exploded perspective view of one embodiment of the accessory mounting system.

FIG. 2 is an exploded perspective view illustration of the accessory mounting system 200. As illustrated in FIG. 2, the base assembly 204 can include fasteners 208, a first locking member 210, and a base assembly second member 212.

Fasteners 208 can fasten other components of the accessory mounting system 200, such as the accessory assembly 206. The base assembly 204 can be in a disassembled, unsecured position when the fasteners 208 of the base assembly 204 are unfastened. A fastener 208 can be used to join together the first locking member 210 and the base assembly second member 212. It is understood that the fasteners 208 can include additional components, systems, subsystems, and elements than those specifically shown and/or described herein. Additionally, or alternatively, the fasteners 208 can omit one or more of the components, systems, subsystems, and elements that are specifically shown and/or described herein. Fasteners 208 that can be used with the accessory mounting system 200 include, but are not limited to, screws, nails, anchors, nuts, bolts, washers, staples, rivets, hooks, and eyes, inserts, rods, pins, and retaining rings.

The first locking member 210 selectively locks or engages another portion of the accessory mounting system 200, as described in greater detail herein. The first locking member 210 can function as a base member of base assembly 204. In some embodiments, the first locking member 210 can serve as an attachment point for the accessory assembly 206. The first locking member 210 can vary depending on the design requirements of the accessory mounting system 200, the accessory 203, the accessory assembly 206, or the vehicle 102. It is understood that the first locking member 210 can include additional components, systems, subsystems, and elements than those specifically shown and/or described herein. Additionally, or alternatively, the first locking member 210 can omit one or more of the components, systems, subsystems, and elements that are specifically shown and/or described herein. The first locking member 210 can include a locking mechanism for selectively engaging and disengaging the base assembly 204 to the accessory assembly 206. The first locking member 210 can include apertures or holes to accommodate the fasteners 208.

The base assembly 204 can include a base assembly second member 212. The base assembly second member 212 can function as a base member of the base assembly 204. The first locking member 210 and the base assembly second member 212 can wrap around the vehicle 102 in a manner similar to the clasps of a mount or a clamp. The base assembly second member 212 can vary depending on the design requirements of the accessory mounting system 200, the accessory 203, the accessory assembly 206, the first locking member 210, or the vehicle 102. It is understood that the base assembly second member 212 can include additional components, systems, subsystems, and elements than those specifically shown and/or described herein. Additionally, or alternatively, the base assembly second member 212 can omit one or more of the components, systems, subsystems, and elements.

As shown in FIG. 2, the first locking member 210 can include a first locking member engager 214. The first locking member engager 214 selectively engages another portion of the accessory mounting system 200, as described in greater detail herein. The first locking member engager 214 can be a track, rail, or guider configured to engage with another portion of the accessory mounting system 200 by sliding, inserting, interacting, or otherwise engaging with another portion of the accessory mounting system 200.

The first locking member engager 214 can vary depending on the design requirements of the accessory mounting system 200, the accessory 203, the accessory assembly 206, the first locking member 210, or the vehicle 102. It is understood that the first member engager 214 can include additional components, systems, subsystems, and elements than those specifically shown and/or described herein. Additionally, or alternatively, the first locking member engager 214 can omit one or more of the components, systems, subsystems, and elements that are specifically shown and/or described herein.

The first locking member 210 and the base assembly second member 212 can be joined together by a joiner 216. The joiner 216 can extend through apertures or holes in both the first locking member 210 and the base assembly second member 212. The joiner 216 can be a fastening point to fasten the first locking member 210 to the base assembly second member 212 so that the first locking member 210 and the base assembly second member 212 can rotate and counter-rotate relative to one another. The joiner 216 allows the base assembly 204 to open and close around a portion of the vehicle 102.

The joiner 216 can vary depending on the design requirements of the accessory mounting system 200, the first locking member 210, the base assembly second member 212, or the vehicle 102. It is understood that the joiner 216 can include additional components, systems, subsystems, and elements than those specifically shown and/or described herein. Additionally, or alternatively, the joiner 216 can omit one or more of the components, systems, subsystems, and elements that are specifically shown and/or described herein. The joiner 216 can be a pin, rod, fastener, shaft, or other stabilizers as provided herein.

The base assembly 204 can further include a collar 218. The collar 218 clamps or fixedly fastens to a portion of the vehicle 102. The other portions of the base assembly 204 wrap around the clamp 218 before the base assembly 204 is secured to the portion of the vehicle 102, such as the handlebars.

The collar 218 can vary depending on the design requirements of the system, the accessory 203, the base assembly 204 or the vehicle 102. It is understood that the collar 218 can include additional components, systems, subsystems, and elements than those specifically shown and/or described herein. Additionally, or alternatively, the collar 218 can omit one or more of the components, systems, subsystems, and elements. The collar 218 can be a clamp or a shaft collar.

The collar 218 can have a rounded or spherical surface. The collar 218 can be utilized as a portion of a universal joint or ball and socket connection. The first locking member 210 and the base assembly second member 212 can wrap around the collar 218 after the collar 218 has been selectively fixed around a portion of the vehicle 102. While in the unsecured position, a user can adjust the position of the other portions of the base assembly 204 with respect to the fixed collar 218 and the vehicle 102 about the three different axes.

The base assembly 204 can include base assembly channels 220 that correspond to the surface shape of the collar 218. The collar 218 can be configured to fit into the shape of the base assembly channels 220, similar to a ball and socket connection. The base assembly channels 220 are configured to allow the non-fixed portions of the base assembly 204 to rotate about the fixed collar 218, while the base assembly 204 is in an unsecured position relative to the vehicle 102.

The base assembly channels 220 can vary depending on the design requirements of the system, the accessory 203, the base assembly 204, the collar 218, or the vehicle 102. It is understood that the base assembly channels 220 can include additional components, systems, subsystems, and elements than those specifically shown and/or described herein. Additionally, or alternatively, the base assembly channels 220 can omit one or more of the components, systems, subsystems, and elements that are specifically shown and/or described herein.

The location of the base assembly channels 220 can vary. As shown in FIG. 2, the base assembly channels 220 can be included on both the first locking member 210 and the base assembly second member 212. The base assembly channels 220 can be centered on both the first locking member 210 and the base assembly second member 212. The shape of the base assembly channels 220 can vary in accordance with the varying shape of the collar 218.

The accessory assembly 206 can include an accessory 203, an accessory assembly first member 222, an accessory assembly retainer 224, and an accessory assembly second member 226. The accessory first member 222 can be a housing of the accessory 203. The accessory first member 222 can be a member of the accessory assembly 206. Other components of the accessory assembly 206 can be attached to the accessory first member 222. The accessory assembly 206 can include an accessory assembly retainer 224 that retains or embraces other components of the accessory assembly 206 or the accessory 203. The accessory assembly second member 226 can be a member of the accessory 203 or the accessory assembly 206. Other components of the accessory assembly 206 can be attached to accessory assembly second member 226. The individual components of the accessory assembly 206 can be fastened together using fasteners 208.

The accessory assembly first member 222 and the accessory assembly second member 226 can vary depending on the design requirements of the system, the accessory 203, the accessory assembly 206, and/or the vehicle 102. It is understood that the accessory assembly first member 222 and the accessory assembly second member 226 can include additional components, systems, subsystems, and elements than those specifically shown and/or described herein. Additionally, or alternatively, the accessory assembly first member 222 and the accessory assembly second member 226 can omit one or more of the components, systems, subsystems, and elements that are specifically shown and/or described herein.

In some embodiments, if the accessory 203 is an illuminator, the accessory assembly 206 can include a light switch button 228, a light switch aperture 230, a lamp 232, and a lamp aperture 234. The light switch button 228 is a button that can be engaged and disengaged to turn the illuminator and/or lamp 232 on or off. The light switch button 228 can be engaged/disengaged via a connected device, such as a smartphone or computer. The light switch button 228 can cycle through various light modes such as variances in luminosity and light flash frequencies.

The light switch button 228 can vary depending on the design requirements of the system, the accessory 203, and/or the vehicle 102. It is understood that the light switch button 228 can include additional components, systems, subsystems, and elements other than those specifically shown and/or described herein. Additionally, or alternatively, the light switch button 228 can omit one or more of the components, systems, subsystems, and elements that are specifically shown and/or described herein.

The light switch aperture 230 is a hole or opening that surrounds or substantially surrounds the light switch button 228. In some instances, the light switch aperture 230 can be implemented around the light switch button 228. The light switch aperture 230 can vary depending on the design requirements of the system, the accessory 203, and/or the vehicle 102. It is understood that the light switch aperture 230 can include additional components, systems, subsystems, and elements than those specifically shown and/or described herein. Additionally, or alternatively, the light switch aperture 230 can omit one or more of the components, systems, subsystems, and elements that are specifically shown and/or described herein.

The lamp 232 is an electrical device, light, or illuminator that projects a luminosity and provides illumination. The lamp 232 can be implemented within an accessory 203. The lamp 232 can be removed or replaced from the accessory 203 via a socket. In one embodiment, the lamp 232 includes one or more light-emitting diodes (LEDs). The lamp 232 can vary depending on the design requirements of the system, the accessory 203, and/or the vehicle. It is understood that the lamp 232 can include additional components, systems, subsystems, and elements than those specifically shown and/or described herein. Additionally, or alternatively, lamp 232 can omit one or more of the components, systems, subsystems and elements that are specifically shown and/or described herein.

The lamp aperture 234 is a hole or opening that surrounds or substantially surrounds the lamp 232. In some instances, the lamp aperture 234 can be implemented around the lamp 232. The lamp aperture 234 can vary depending on the design requirements of the system, the accessory 203, and/or the vehicle. It is understood that the lamp aperture 234 can include additional components, systems, subsystems and elements than those specifically shown and/or described herein. Additionally, or alternatively, the lamp aperture 234 can omit one or more of the components, systems, subsystems, and elements that are specifically shown and/or described herein.

The accessory assembly 206 can include a second locking member 236. The second locking member 210 functions as a member of accessory assembly 206. In some embodiments, the second locking member 236 can serve as an attachment point for the accessory assembly 206. The second locking member 236 selectively locks or engages the first locking member 210. In certain embodiments, the second locking member 236 and the first locking member 210 can engage each by counter rotating in opposite directions about the pitch axis.

The second locking member 236 can vary depending on the design requirements of the system, the accessory 203, or the vehicle 102. It is understood that the second locking member 236 can include additional components, systems, subsystems, and elements than those specifically shown and/or described herein. Additionally, or alternatively, the second locking member 236 can omit one or more of the components, systems, subsystems, and elements that are specifically shown and/or described herein. The second locking member 236 can include a locking mechanism for selectively engaging and disengaging the first locking member 210. The second locking member 236 can further include apertures or holes to accommodate the fasteners 208.

As shown in FIG. 2, the second locking member 236 can include a second locking member engager 238. The second locking member engager 238 selectively engages the first locking member engager 214. The second locking member engager 238 can be a track, rail, or guider configured to engage with another engager by sliding, inserting, interacting, or otherwise engaging. The second locking member engager 238 can be configured to have a shape or track that fits within the shape or track of the first locking member engager 214.

The second locking member engager 238 vary depending on the design requirements of the system, the accessory 203, the accessory assembly 206 or the vehicle 102. It is understood that the second locking member engager 238 can include additional components, systems, subsystems, and elements than those specifically shown and/or described herein. Additionally, or alternatively, the second locking member engager 238 can omit one or more of the components, systems, subsystems, and elements that are specifically shown and/or described herein.

The second locking member 236 can include a second locking member lock releaser 240. Alternatively, the second locking member lock releaser 240 can be included on the first locking member 210. The second locking member lock releaser 240 releases the lock or engager that locks or secures the first locking member 210 to the second locking member 236, as described in greater detail herein.

The second locking member lock releaser 240 can vary depending on the design requirements of the system, the accessory 203, the accessory assembly 206, the first locking member 210, the second locking member 236, or the vehicle 102. It is understood that the second locking member lock releaser 240 can include additional components, systems, subsystems, and elements than those specifically shown and/or described herein. Additionally, or alternatively, the second locking member lock releaser 240 can omit one or more of the components, systems, subsystems, and elements that are specifically shown and/or described herein.

The second locking member lock releaser 240 can include a spring 242 or another locking mechanism. The second locking member lock releaser 240 can include a button that allows the lock to be released or locked by engaging or disengaging the button accordingly. In some embodiments, while the second locking member lock releaser 240 is disengaged, the accessory assembly 206 will be in a locked position with respect to the base assembly 204. While the second locking member lock releaser 240 is engaged, the accessory assembly 206 can be removed from the base assembly 204.

Figure 3:
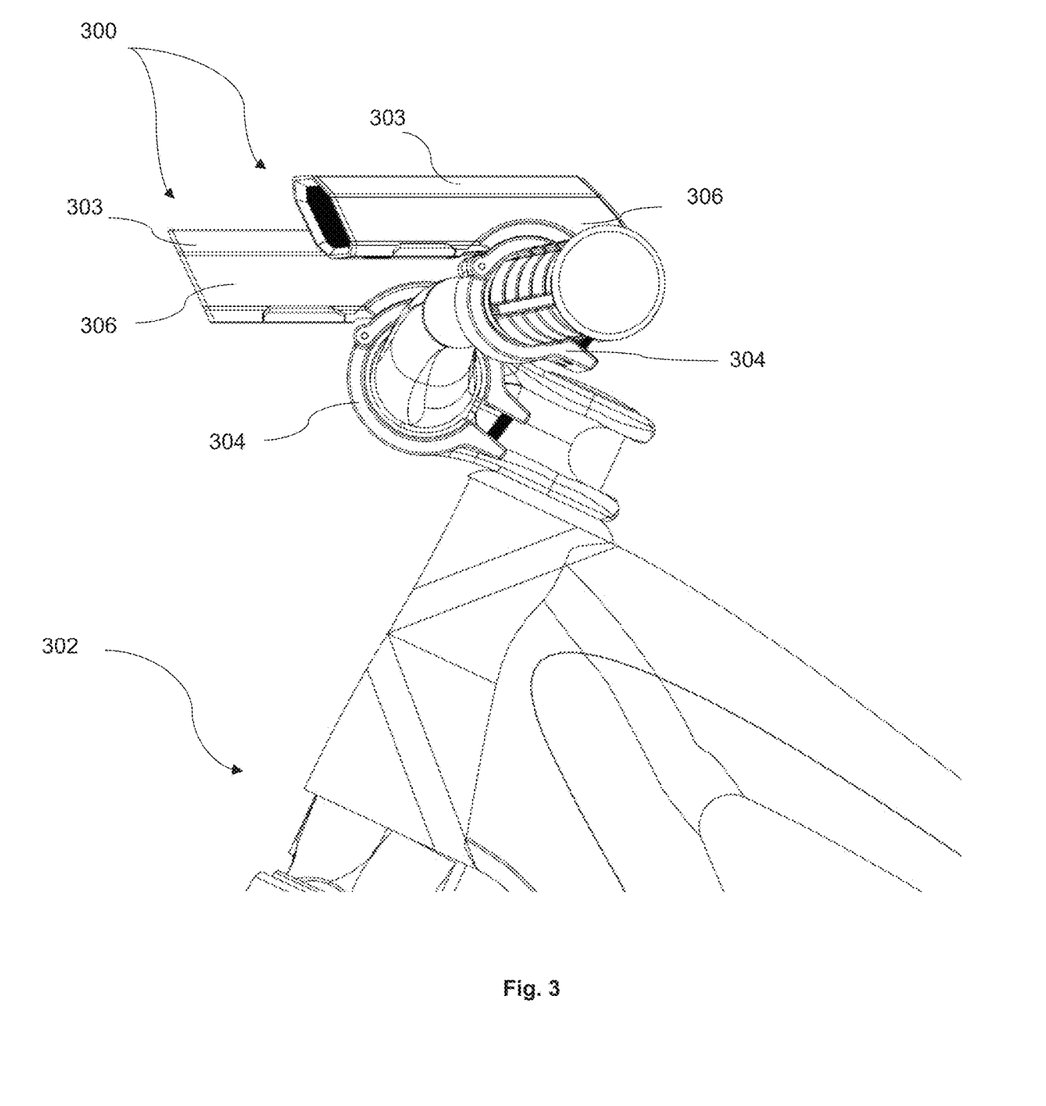
FIG. 3 is a side view of a vehicle and one embodiment of the accessory mounting system that is mounted to the vehicle, the accessory mounting system being shown in a fixedly secured position relative to the vehicle.

FIG. 3 is a side view of a vehicle 302 and one embodiment of the accessory mounting system 300 including accessories 303 that are mounted to the vehicle 302. FIG. 3 is illustrative of the accessory mounting system 300 where the base assemblies 304 and the accessory assemblies 306 are in a locked position and a fixedly secured position relative to the vehicle 302. In the embodiment shown in FIG. 3, the base assemblies 304 and accessory assemblies 306 are shown at different degrees of yaw rotation with respect to the yaw axis previously described.

Figure 4:
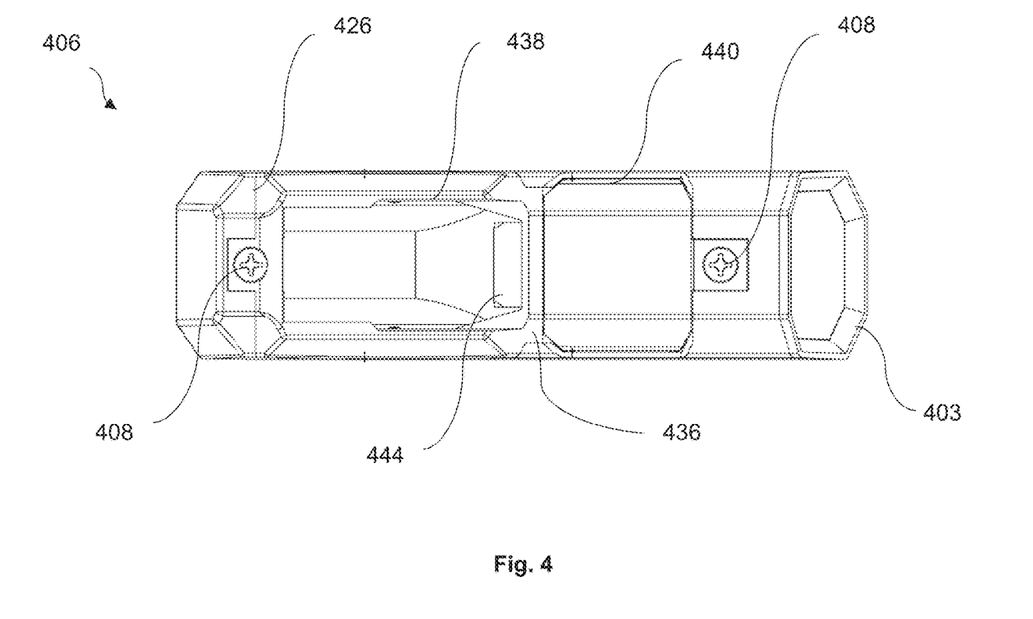
FIG. 4 is a bottom view of one embodiment of the accessory assembly.

FIG. 4 is a bottom view of one embodiment of the accessory assembly 406 including an accessory 403. As shown in FIG. 4, the various components of the accessory assembly 406 are in a fastened state, the components are fastened together using fasteners 408. The accessory assembly 406 can have an accessory assembly second member 426, as previously described herein. The various components shown in FIG. 4 can be fastened or attached to the accessory assembly second member 426. For example, the accessory assembly 406 can have a second locking member 436 that is fastened to the accessory assembly second member 426. The components of the second locking member 436 can be fastened together as previously described or by known methods in the art.

The second locking member 436 can include a second locking member engager 438, a second locking member lock releaser 440, and a second locking member lock 444. The second locking member lock 444 can be a latch, clasp, or other suitable locks known in the art. The second locking member lock 444 can be a selectively fixable latch or lock that locks the first locking member 210. In some embodiments, the second locking member lock 444 can be movable so that it moves between a locked position (holding the first locking member 210 and the base assembly 204 in the locked position) and an unlocked position (so the second locking member 436 can be disengaged from the first locking member 210).

The second locking member lock 444 can vary depending on the design requirements of the system, the accessory 403, the accessory assembly 406, the second locking member 436, or the vehicle 102. It is understood that the second locking member lock 444 can include additional components, systems, subsystems, and elements other than those specifically shown and/or described herein. Additionally, or alternatively, the second locking member lock 444 can omit one or more of the components, systems, subsystems, and elements that are specifically shown and/or described herein.

The second locking member lock 444 can be released by the second locking member releaser 440. In various embodiments, a user can engage and disengage the second locking member lock 444 by pressing a button located on the second locking member releaser 440. The second locking member releaser 440 can utilize any known lock release mechanism known in the art.

Figure 5A:
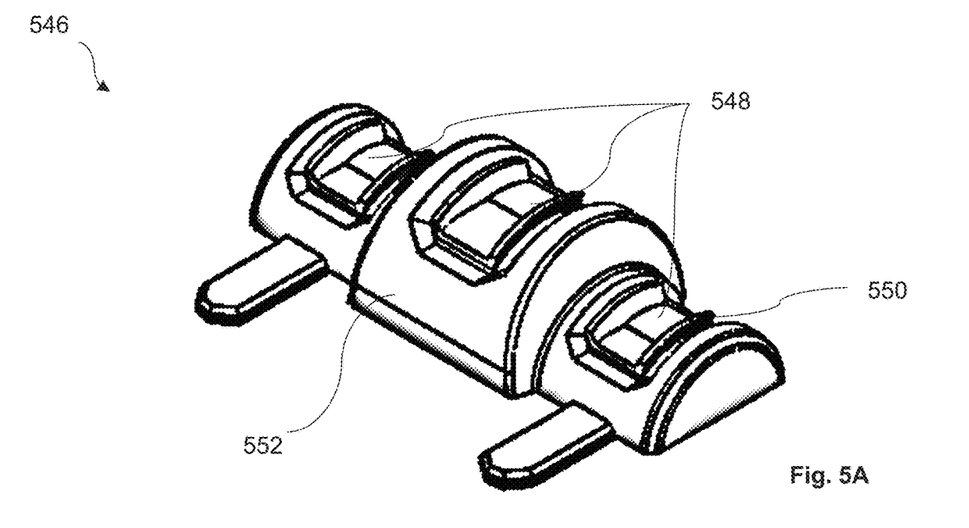
FIG. 5A is a perspective view of one embodiment of a charger of the accessory mounting system.

FIG. 5A is a perspective view of one embodiment of a charger 546 of the accessory mounting system 100. The charger 546 can charge the electrical components of accessories 103 (not shown in FIG. 5A). The charger 546 can function as a docking station for accessories 103 while they are not in use.

The charger 546 can vary depending on the design requirements of the system, the accessory 103, the accessory assembly 406, or the vehicle 102. The charger 546 can be a single charger 546 or it can be a plurality of chargers 546 acting as a single charger 546. It is understood that the charger 546 can include additional components, systems, subsystems, and elements other than those specifically shown and/or described herein. Additionally, or alternatively, the charger 546 can omit one or more of the components, systems, subsystems, and elements that are specifically shown and/or described herein.

The charger 546 can include a charge receiver engager 548, a charge receiver engager track 550, and a charger housing 552. The charger 546 components can be attached, adhered, and/or fastened together using methods known in the art, including the fasteners 408 previously described herein. The charger receiver engager 548 can have a similar form and function as the first locking member 210 and second locking member 236.

In particular, the charger receiver engager 548 can be configured to receive the accessory assembly 406, to be described in greater detail herein. The charger receiver engager 548 can otherwise be formed in any manner suitable to receive the accessory assembly 406 and charge the accessory 403. The charger receiver engager 548 can be formed or configured in a similar manner as the first locking member engager 214, so that the second locking member 236 can engage the charger receiver engager 548.

The charger receiver engager 548 can vary depending on the design requirements of the system, the accessory 403, or the vehicle 102. It is understood that the charger receiver engager 548 can include additional components, systems, subsystems, and elements than those specifically shown and/or described herein. Additionally, or alternatively, the charger receiver engager 548 can omit one or more of the components, systems, subsystems, and elements that are specifically shown and/or described herein.

The charge receiver engager 548 can have a charge receiver engager track 550 that corresponds to the second locking member engager 238 of the accessory assembly 206, to be shown and described in greater detail herein. The charge receiver engager track 550 can have a similar form and function as the second locking member engager 238 previously described herein. In particular, the charge receiver engager track 550 can be configured to engage the second locking member engager 238 of the accessory assembly 206.

The charger 546 can have a charger housing 552 that houses or protects the interior components of the charger 546. The components of the charger 546 can be fastened, adhered, and/or attached to the charger housing 552 as previously described or by known methods in the art.

The charger housing 552 can vary depending on the design requirements of the system, the accessory 403, or the vehicle 102. It is understood that the charger housing 552 can include additional components, systems, subsystems, and elements other than those specifically shown and/or described herein. Additionally, or alternatively, the charger housing 552 can omit one or more of the components, systems, subsystems, and elements that are specifically shown and/or described herein. The charger housing 552 can be formed with plastics, metals, rubbers, or any other suitable material known in the art.

Figure 5B:
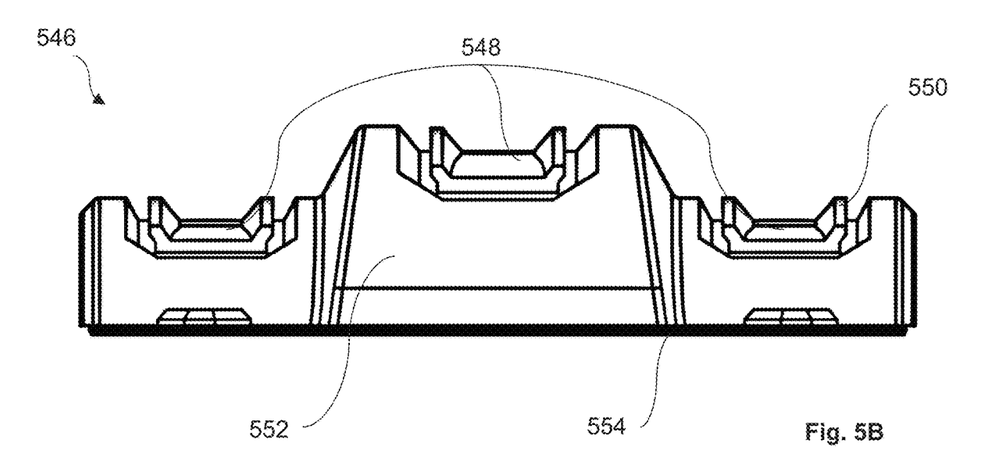
FIG. 5B is a front view illustration of the charger illustrated in FIG. 5A.

FIG. 5B is a front view illustration of the charger 546 illustrated in FIG. 5A. The charger 546 can further include a charger bottom 554, as illustrated in FIG. 5B. The charger bottom 546 can protect the lower portion of the charger housing 552 and interior components of the charger 546. The charger bottom 546 can prevent the charger 546 from sliding or slipping on a surface. The charger bottom 554 can be formed with plastics, metals, rubbers, or any other suitable material known in the art. The charger bottom 554 can be only one bottom or can include a plurality of feet.

The charger bottom 554 can vary depending on the design requirements of the system, the accessory 403, or the accessory assembly 406. It is understood that the charger bottom 554 can include additional components, systems, subsystems, and elements other than those specifically shown and/or described herein. Additionally, or alternatively, the charger bottom 554 can omit one or more of the components, systems, subsystems, and elements that are specifically shown and/or described herein.

Figure 6:
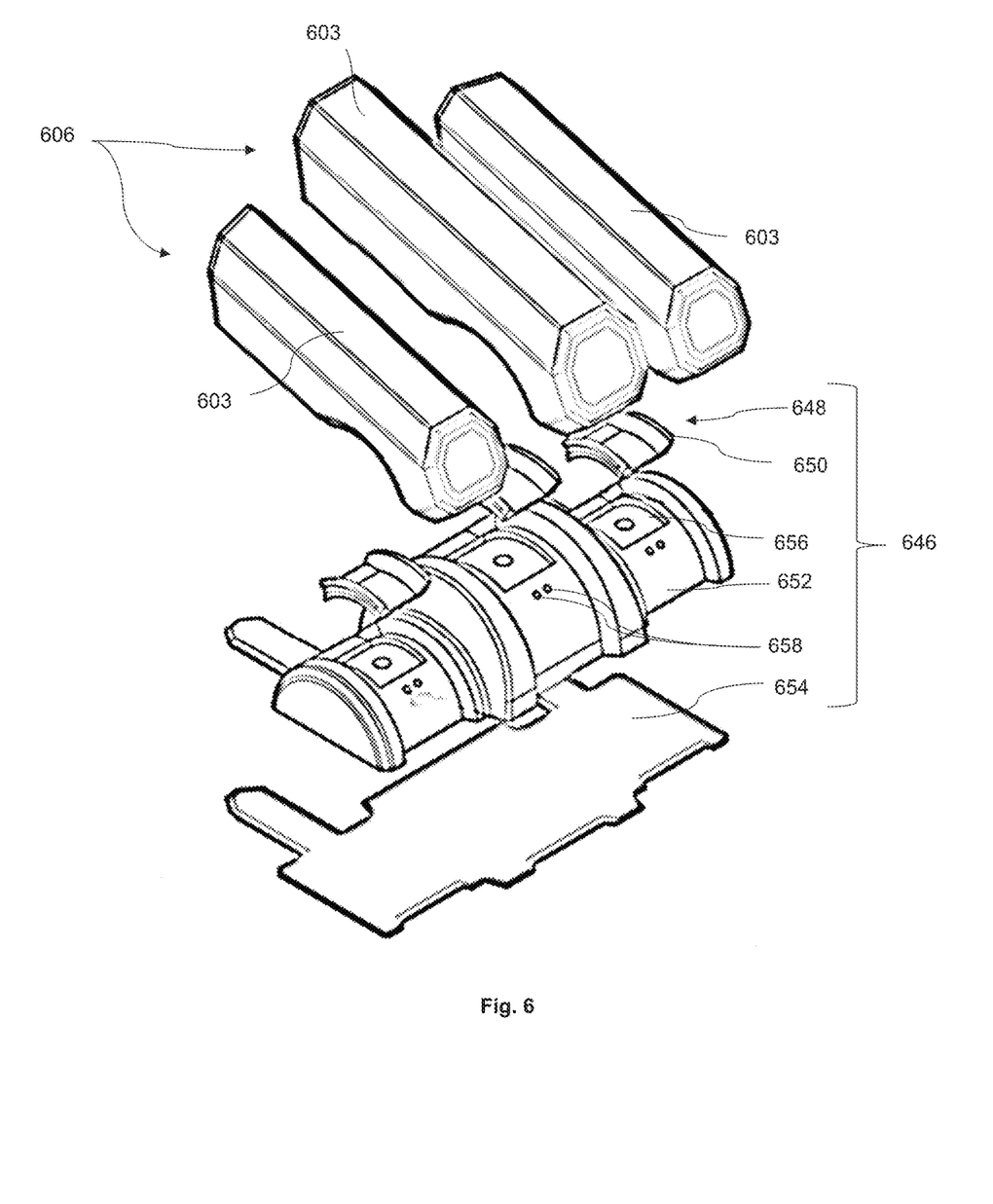
FIG. 6 is a partial exploded perspective illustration of one embodiment of the charger and a plurality of accessory assemblies.

FIG. 6 is a partial exploded perspective illustration of one embodiment of the charger 646 and three accessory assemblies 606, each of the accessory assemblies 606 including an accessory 603. As illustrated in FIG. 6, the partial exploded perspective demonstrates how an accessory assembly 606 engages the charger 646. As previously described the charger 646 can include a charge receiver engager 648, a charger housing 652, and a charger bottom 654. In some embodiments, the charger 646 can be an inductive charging bar or wireless charging bar.

In some embodiments, the charger 646 can include a charger receiver engager slot 656. The charger receiver engager slot 656 can be a slot, hole, aperture, or any suitable structure that can accommodate the charge receiver engager 648. The charge receiver engager 648 can attach and detach from the charger housing 652 using methods known in the art. The charger receiver engager slot 656 allows the charge receiver engager 648 to be detached for cleaning, repair, or replacement.

The charger engager slot 656 can vary depending on the design requirements of the system, the accessory 603, the accessory assembly 606, or the vehicle 102. It is understood that the charger engager slot 656 can include additional components, systems, subsystems, and elements than those specifically shown and/or described herein. Additionally, or alternatively, charger engager slot 656 can omit one or more of the components, systems, subsystems, and elements that are specifically shown and/or described herein. The charge receiver engager 648 and charger receiver engager slot 656 can each include a magnet of opposing polarities so that the charge receiver engager 648 can become secured within the charger engager slot 656.

The charger 656 can include a charging element 658. The charging element 658 can charge the accessory 603. The charging element 658 can vary depending on the design requirements of the system, the accessory 603, the accessory assembly 606, or the vehicle 102. It is understood that the charging element 658 can include additional components, systems, subsystems, and elements other than those specifically shown and/or described herein. Additionally, or alternatively, the charging element 658 can omit one or more of the components, systems, subsystems, and elements that are specifically shown and/or described herein. The charging element 658 can be a single element or can be a plurality of charging elements 658 (as shown in FIG. 6). In one embodiment, the charging element 658 can be a pogo pin charging contact or any suitable charging element 658 known in the art.

The charging element 658 can be molded into the charger housing 652, as illustrated in FIG. 6. In some embodiments, the charging element 658 can be incorporated into the charge receiver engager 648 or any other component of the charger 646, so long as the charging element 658 is configured to charge the accessory 603. The accessory 603 or the accessory assembly 606 can include a charge receiver to be described in greater detail herein (not shown in FIG. 6) that receives charging from the charging element 658.

Figure 7A:
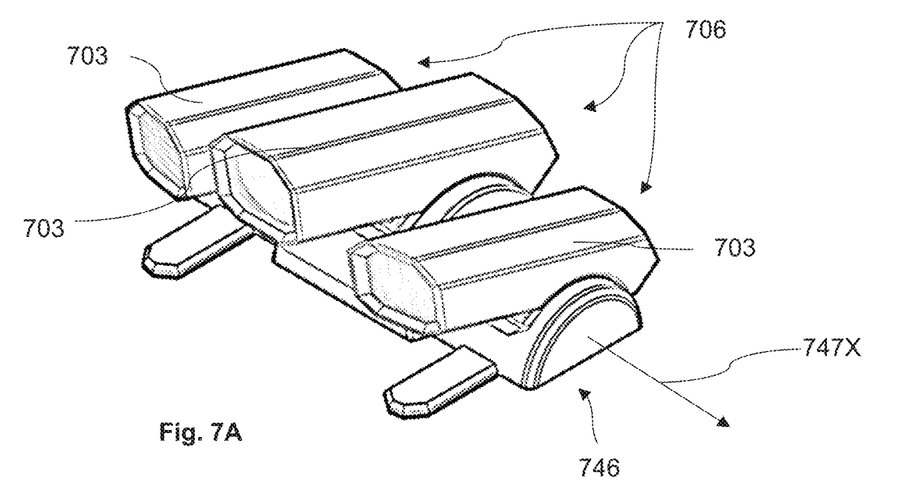
FIG. 7A is a perspective view of one embodiment of the charger and a plurality of accessory assemblies, illustrated in unlocked non-charging position relative to the charger.

FIG. 7A is a perspective view of one embodiment of the charger 746 and three accessory assemblies 706 each including an accessory 703. In FIG. 7A, the accessory assemblies 706 are illustrated in an unlocked non-charging position relative to the charger 746. FIG. 7A illustrates the accessory assembly 706 prior to rotatably engaging the charger 746. When the accessory assembly 706 engages the charger 746 and reaches the locked position, the charger 746 begins charging the accessory 703.

The charger 746 can have a first charger axis 747X that is similar to the first axis 107X previously described herein. In some embodiments, the accessory assembly 706 has a track that rotatably engages with a track on the charger 746 between an unlocked position and a locked and charging position and about the first charger axis 747X. These tracks can be similar to the engagers previously described herein. The accessory assemblies 706 can engage the charger 746 using engagement methods known in the art. In some embodiments, in addition to the first charger axis 747X, the charger 746 can afford further degrees of freedom to the accessory assembly 706 while the accessory assembly 706 and the charger 746 are in the unlocked position.

Figure 7B:
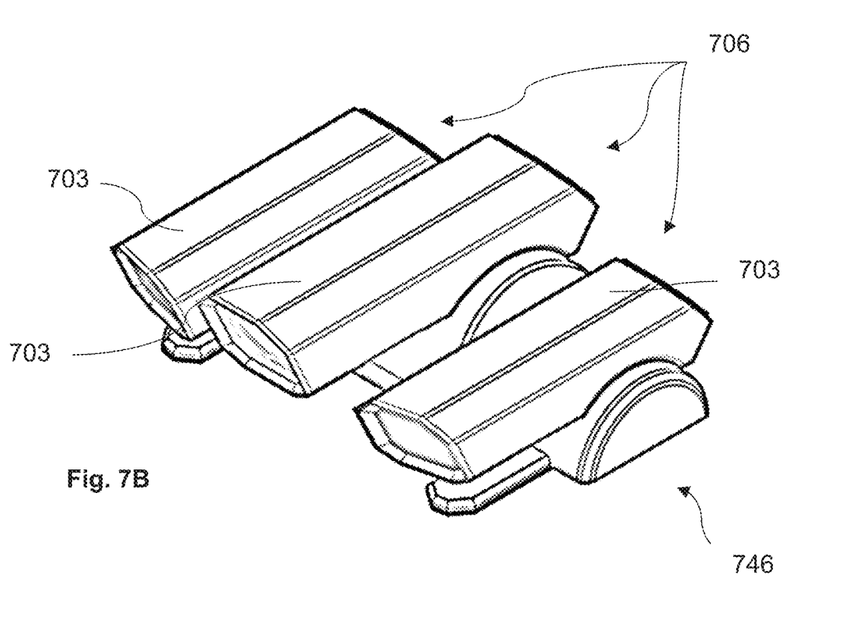
FIG. 7B is a perspective view of the charger and the plurality of accessory assemblies illustrated in FIG. 7A, illustrated in a charging position.

FIG. 7B is a perspective view of the charger 746 and the plurality of accessory assemblies 706 each including an accessory 703 illustrated in FIG. 7A, illustrated in a charging position. FIG. 7B illustrates the accessory assembly 706 after being rotatable engaged about the first charger axis 747X, and locked by the charger 746. The charger 746 can lock the accessory assembly 706 in a charging position similar to the locking mechanisms described herein. The charger 746 can lock the accessory assembly 706 using other locking mechanisms known in the art.

Figure 8A:
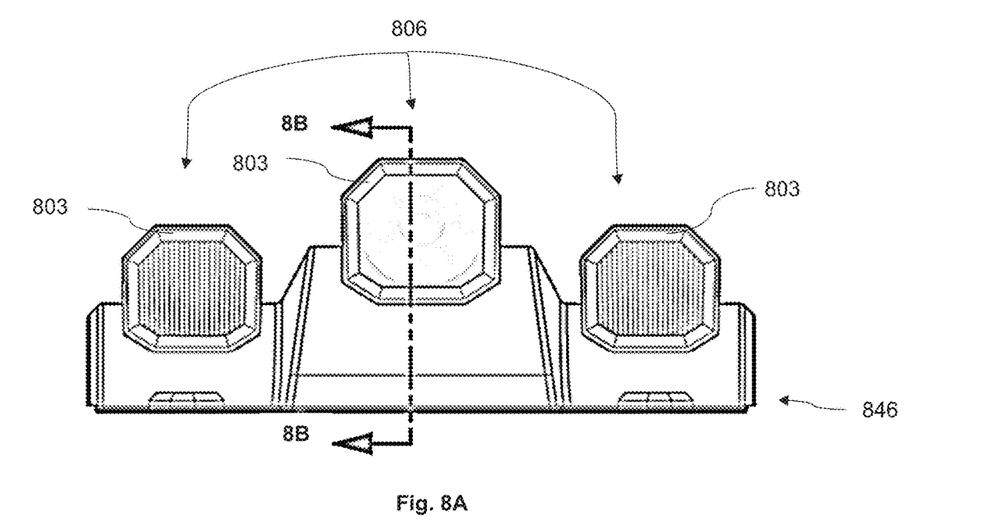
FIG. 8A is a front view of one embodiment of the charger and a plurality of accessory assemblies, illustrated in the charging position.

FIG. 8A is a front view of one embodiment of the charger 846 and a plurality of accessory assemblies 806 each including an accessory 803, illustrated in the charging position.

Figure 8B:
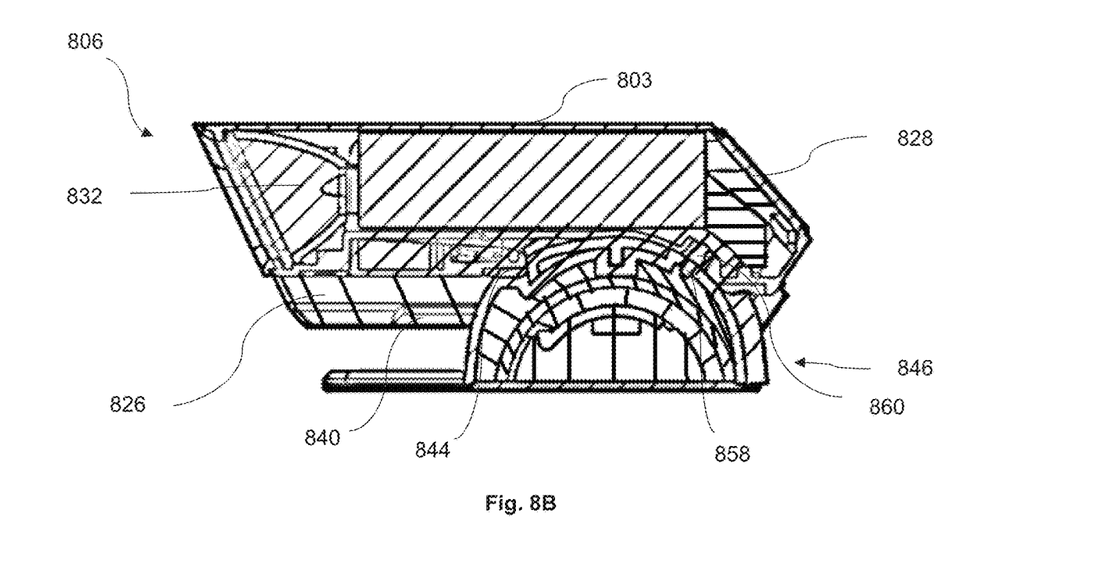
FIG. 8B is a cross sectional view of the charger and one accessory assembly taken on line 8B-8B in FIG. 8A.

FIG. 8B is a cross-sectional view taken on line 8B-8B in FIG. 8A. As illustrated in cross-sectional view of FIG. 8B, the accessory assembly 806 can include an accessory assembly second member 826, a light switch button 828, a lamp 832, and a second locking member lock releaser 840, a second locking member lock 844, and a charge receiver 860. The charger 846 can include a charging element 858.

The charge receiver 860 receives charging from the charging element 858. The charge receiver 860 can vary depending on the design requirements of the system, the accessory 803, the accessory assembly 106, or the charging element 858. It is understood that the charge receiver 860 can include additional components, systems, subsystems, and elements than those specifically shown and/or described herein. Additionally, or alternatively, the charge receiver 860 can omit one or more of the components, systems, subsystems, and elements that are specifically shown and/or described herein. The charging element 858 and the charge receiver 860 can both be spring-loaded pogo pins. While the accessory assembly 806 is in a locked and charging position with the charger 846, the charging element 858 and the charge receiver 860 are in electrical contact.

In some embodiments, the accessory mounting system 100 and accessories 103 described herein can be used in conjunction with a mobile application that optimizes the use of the accessory to help prolong the battery life. A user downloads the specific trail route onto their mobile device ahead of time and the application facilitates the optimal use of power from the accessory with respect to the downloaded trail. The individual accessories 103 and the system would be controllable via a user interface on the mobile application. For example, manual changes to electrical output would be accessible on the application.

In other embodiments, multiple wirelessly connected accessories 103 can be separate devices in a system of at least two (or three, or more) of the devices that are spaced apart on the handlebars (or other locations on a bike or a helmet). In combination with the features described above, the accessories 103 can work in combination to provide a full field of illumination for better visibility. For example, under certain trail visibility conditions, one accessory 103 may need to output more power than another device in the system to compensate for darker portions of the trail.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

It is understood that although a number of different embodiments of the systems and methods have been illustrated and described herein, one or more features of any one embodiment can be combined with one or more features of one or more of the other embodiments, provided that such combination satisfies the intent of the present invention.

While a number of exemplary aspects and embodiments of the user interface and methods have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope, and no limitations are intended to the details of construction or design herein shown.

What is claimed is:

1. An accessory mounting system for mounting an accessory to a vehicle, the accessory mounting system comprising:
   a base assembly that is fixedly positionable on the vehicle about a first axis, the base assembly including a first locking member and a base assembly second member; and
   an accessory assembly that is removably securable to the base assembly, the accessory assembly including a second locking member that selectively engages the first locking member, the accessory assembly being rotatable about the first axis relative to the base assembly between (i) a disengaged position wherein the locking members are disengaged from one another so that the accessory assembly is removable from the base assembly, and (ii) an engaged position wherein the locking members are engaged with one another so that the accessory assembly is removably secured to the base assembly.

2. The accessory mounting system of claim 1 wherein the base assembly further includes a collar that receives the first locking member and the base assembly second member, the collar being configured to allow movement of the first locking member and the base assembly second member relative to the vehicle.

3. The accessory mounting system of claim 1 wherein the accessory assembly includes an illuminator.

4. The accessory mounting system of claim 1 wherein the accessory assembly is configured to selectively rotate relative to the vehicle about a second axis that is different than the first axis.

5. The accessory mounting system of claim 4 wherein the first axis is a pitch axis.

6. The accessory mounting system of claim 5 wherein the base assembly and the accessory assembly cooperate so that the accessory assembly is infinitely positionable about the pitch axis when the base assembly is in the unsecured position.

7. The accessory mounting system of claim 4 wherein the second axis is a roll axis.

8. The accessory mounting system of claim 7 wherein the base assembly and the accessory assembly cooperate so that the accessory assembly is infinitely positionable about the roll axis when the base assembly is in the unsecured position.

9. The accessory mounting system of claim 4 wherein the accessory assembly is configured to selectively rotate relative to the vehicle about a third axis that is different than the first axis and second axis when the base assembly is in the unsecured position.

10. The accessory mounting system of claim 9 wherein the third axis is a yaw axis.

11. The accessory mounting system of claim 10 wherein the base assembly and the accessory assembly cooperate so that the accessory assembly is infinitely positionable about the yaw axis when the base assembly is in the unsecured position.

12. The accessory mounting system of claim 10 wherein the first axis is substantially perpendicular to at least one of the second axis and the third axis.

13. The accessory mounting system of claim 10 wherein the base assembly is a truncated ball and socket joint.

14. The accessory mounting system of claim 1 wherein the base assembly has three degrees of freedom relative to the vehicle.

15. The accessory mounting system of claim 1 wherein the base assembly and the accessory assembly are movable in concert relative to the vehicle about the first axis, a second axis, and a third axis while the base assembly is in the unsecured position.

16. An accessory mounting system for mounting an accessory to a vehicle, the accessory mounting system comprising:
    a base assembly that is adjustable on the vehicle about a first axis and a second axis that is different than the first axis so that the base assembly has at least two degrees of freedom while the base assembly is in an unsecured position, the base assembly including a first locking member; and
    an accessory assembly that is removably securable to the base assembly about the first axis and the second axis so that the accessory assembly has at least two degrees of freedom, the accessory assembly including a second locking member that selectively engages the first locking member, the accessory assembly being rotatable about the first axis relative to the base assembly between (i) a disengaged position wherein the locking members are disengaged from one another so that the accessory assembly is removable from the base assembly, and (ii) an engaged position wherein the locking members are engaged with one another so that the accessory assembly is removably secured to the base assembly.

17. The accessory mounting system of claim 16 wherein the accessory assembly includes an accessory and a charge receiver that receives electricity that charges the accessory.

18. The accessory mounting system of claim 17 further comprising a charger that receives the accessory assembly, the charger including a charge receiver engager that (i) electrically engages the charge receiver of the accessory assembly during charging of the accessory, and (ii) electrically disengages from the charge receiver of the accessory assembly.

19. The accessory mounting system of claim 18 wherein the charger has a charger pitch axis, the accessory assembly and the charger rotating relative to one another about the charger pitch axis between a non-charging position and a charging position.

20. An accessory mounting system for mounting an accessory to a vehicle, the accessory mounting system comprising:
    a base assembly that is fixedly positionable on the vehicle about a first axis, a second axis, and a third axis, the base assembly including a first locking member; and
    an accessory assembly that is removably securable to the base assembly, the accessory assembly including an accessory, a charge receiver, and a second locking member that selectively engages the first locking member, the accessory assembly being rotatable about the first axis relative to the base assembly between (i) a disengaged position wherein the locking members are disengaged from one another so that the accessory assembly is removable from the base assembly, and (ii) an engaged position wherein the locking members are engaged with one another so that the accessory assembly is removably secured to the base assembly, the second locking member including a lock that is configured to be selectively locked and unlocked so that the second locking member can be selectively engaged to the first locking member.

* * * * *